W. H. CHAPMAN

June 27, 1933. MOTOR VEHICLE HEADLAMP Re. 18,879

Original Filed Sept. 30, 1929 2 Sheets-Sheet 1

INVENTOR.
WILLIAM H. CHAPMAN.
BY Prawer Griffith,
ATTORNEY

W. H. CHAPMAN

June 27, 1933. MOTOR VEHICLE HEADLAMP Re. 18,879

Original Filed Sept. 30, 1929 2 Sheets-Sheet 2

INVENTOR.
WILLIAM H. CHAPMAN.
BY Graves Griffith,
ATTORNEY.

Reissued June 27, 1933

Re. 18,879

UNITED STATES PATENT OFFICE

WILLIAM H. CHAPMAN, OF OAKLAND, CALIFORNIA

MOTOR VEHICLE HEADLAMP

Original No. 1,809,022, dated June 9, 1931, Serial No. 396,023, filed September 30, 1929. Application for reissue filed September 6, 1932. Serial No. 631,930.

The present invention relates, broadly, to new and useful improvements in motor-vehicle head-lamps, but more particularly to motor-vehicle road-lamps of duplex character for use in night driving, either as auxiliaries to the usual head-lamps or independently thereof, as may be desired by the driver of the vehicle.

The lamp of the present invention is provided with a substantially two-winged main reflecting member, preferably mounted in the center of the front end of the radiator of the vehicle between the usual head-lamps, or it may be mounted in any other convenient position, so that the rays from its illuminant may be projected forwardly of the vehicle in fan-shaped form to light the roadway on both sides of and substantially in the paths followed by the steering wheels of the vehicle.

The main reflecting member is of duplex form, as to construction, with a single centrally disposed light bulb, the individual elements constituting this member being angularly disposed and arranged on opposite sides of the bulb, in such manner that the light rays from this source are equally divided and directed in divergent courses, or forwardly and angularly, relative to the line of travel of the vehicle.

The head-lamp is also constructed with a view to overcoming, in great measure, that glare of the illuminant as ordinarily met when approaching a vehicle not thus equipped, through the use of a centrally disposed anti-glare shield of concave reflecting interior and opaque exterior, adapted to receive and reflect all light rays directed centrally and forwardly by the illuminant, these rays being equally distributed by the two sides rearwardly to the main reflectors, to be given, again, by these, divergent reflections upon opposite sides of the shield, to be recombined with the directly emergent rays reflected therefrom, as fan-shaped beams illuminating both sides of the roadway, the shield protecting perfectly, from glare, the eyes of those approaching.

The primary object of the invention is the provision of a motor-vehicle lamp of duplex character, having a single illuminant arranged centrally between two angularly disposed reflecting surfaces borne respectively thereby, and adapted to receive and equally distribute the light received from said illuminant, and to project it forwardly as two distinct beams.

Another object of the invention is the provision of a motor-vehicle lamp of duplex character having a single illuminant and angularly disposed reflectors arranged on opposite sides thereof and adapted to direct the light rays in equally divided fan-shaped beams, and including a centrally disposed anti-glare shield arranged in front of the illuminant and between the reflectors, so that the illuminant is completely hidden from view when looking directly into the lamp, the rearward side of said shield being concave and reflective and its opposite, or frontal, side opaque.

An additional object of the invention is the provision of a motor-vehicle lamp which is of simple and durable character and which is very economical in operation, due to the fact that a single light bulb furnishes the desired illumination for the lamp.

Further objects of the invention will become apparent, as the description is read in connection with the accompanying drawings, showing a selected embodiment of the invention, and in which:—

Figure 4:
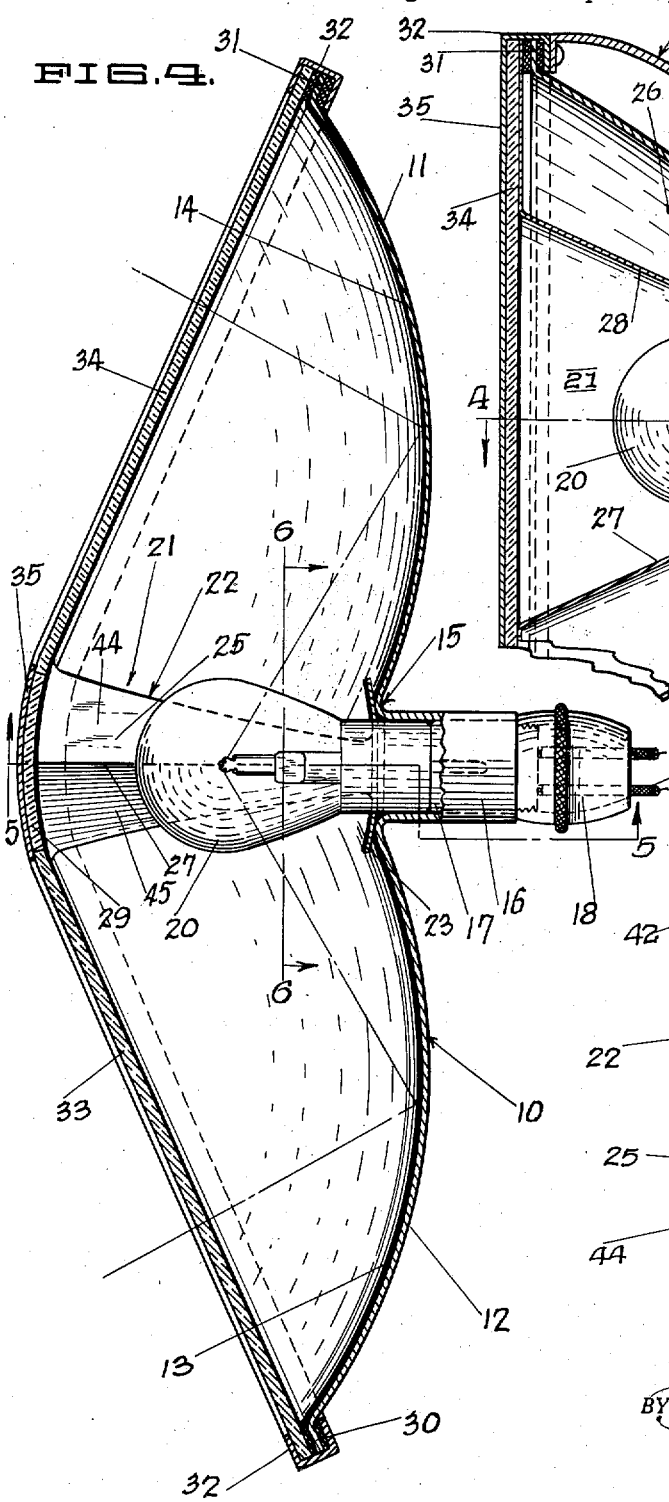
Figure 4 is a considerably enlarged horizontal sectional view taken through the entire lamp casing, showing the centrally disposed illuminant and the opposite similar and angularly disposed reflectors, also, the centrally disposed reflector and opaque anti-glare shield, the view being indicated by the section lines 4—4, in Figures 3 and 5.
Figure 5:
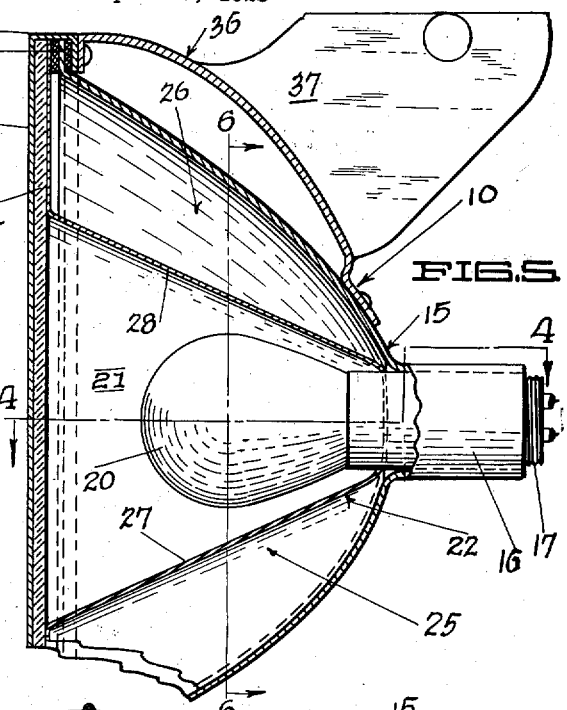
Figure 6:
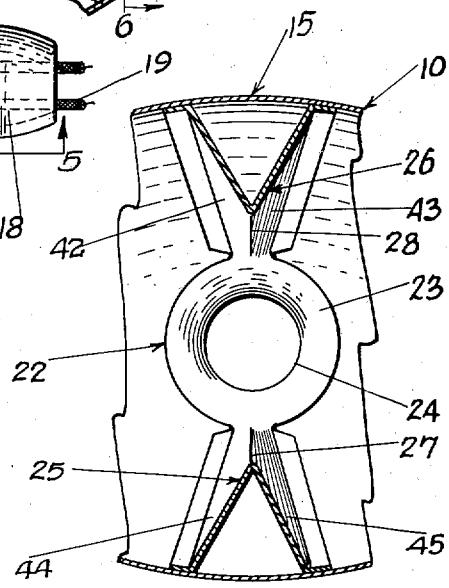

Figure 5 is a vertical mid-section of the lamp-casing, showing the illuminant, the light dividing elements, the centrally disposed reflector and anti-glare shield, the section being indicated by the section line 5—5, in Figure 4; and Figure 6 is a transverse sectional detail of a portion of the central section of the casing and illustrating the shape and disposition of the light dividing elements, the section being indicated by the section lines 6—6 in Figures 4 and 5.

In the drawings a preferred form of lamp casing has been illustrated and this casing is designated, in a general way by the numeral 10. The casing 10 is constructed of suitable metal and is pressed to form opposite and angularly disposed shell-like members 11 and 12 provided on their inner surfaces 13 and 14 with any suitable reflective substance, such as plating, or any other suitable substance commonly used for the purpose.

The intermediate section 15 of the lamp casing 10 is provided with a rearwardly projecting cylindrical socket 16 in which is mounted the usual plug 17 having screwed on its outer end the member 18, and through which the feed wires 19 extend and are connected to the light circuit of the vehicle in any convenient manner.

The light bulb 20 is of the slip type and is inserted in the socket 16 against the plug 17 as shown in Figure 4, and said bulb extends into the central chamber 21 formed between the shell-like members 11 and 12.

The light deflecting element 22 is formed from a single piece of material having its entire surface provided with a suitable reflective substance, as hereinbefore described in connection with the reflectors 11 and 12, said light deflecting element embodying a central circular member 23 having an opening 24 therein to accommodate the slip plug of the light bulb 20, and having angular sections 25 and 26 gradually increasing in size toward their outer extremities, as clearly shown in Figure 6.

The inner edges 27 and 28 of the angular sections are disposed toward each other and these edges are arranged in a line corresponding to the line of travel of the vehicle and extend from the inner side of the section 15 of the casing outwardly and divergently toward the central reflector member 29 which is mounted in the casing directly in front of the light bulb 20, the member 26 being positioned directly above the light bulb and the member 27 directly beneath said bulb.

The members 11 and 12 of the casing 10 are of arcuate form in cross section while the central section 15 thereof is substantially of parabolic form, as indicated in Figure 5. The front edges of the members 11 and 12 of the casing are flanged as indicated, respectively, at 30 and 31 and a continuous U-shaped bead 32 extends completely around the edges of this casing and secures tightly in place the lens plates 33 and 34 and the centrally disposed reflector plate 29, as clearly shown in Figure 4.

The beading 32 includes a centrally and vertically disposed strip 35 which covers the reflector plate 29, and, being of opaque character, entirely obscures the light bulb 20, when viewed directly from the front of the lamp, as by a person driving toward a vehicle so equipped, thus eliminating completely the glare so commonly prevalent in all motor vehicle lights.

The casing 10 is mounted on the vehicle in any suitable manner, and, as here shown, this mounting consists of a centrally positioned member 36 providing ears 37 and 38 having aligned openings therein for the reception of a clamping bolt 39 which bolt is adapted to rigidly clamp the ears 37 and 38 against a suitable supporting arm 40 which may be mounted upon the tie rod 41, or on any other suitable part of the vehicle, the lamp casing, as a whole, being adjustable to tilt the same to any angle relative to the roadway, this angle depending entirely on the various state laws governing the distance ahead of the vehicle at which the light rays should be dissipated upon the roadway.

From the foregoing description it is quite obvious that the light rays from the upper and lower sides of the illuminant will be equally deflected by the sections 25 and 26 of the light deflecting element 22, the upper rays being reflected rearwardly by the reflective surfaces 42 and 43 and the lower rays being equally reflected rearwardly by the reflective surfaces 44 and 45.

The light rays as reflected from the surfaces 42, 43, and 44 and 45, of the light deflecting element 22 will be received and reflected by the reflectors 13 and 14 and the light rays from the front side of the illuminant will be received by the reflector 29, which is arcuate in form, as shown in Figure 4, and equally reflected rearwardly to be received and re-reflected by the said reflectors 13 and 14 of the casing.

In the above described manner a portion of the light rays from the illuminant undergoes a single reflection while another portion thereof undergoes a double reflection, the latter being those rays striking the light deflecting element 22 and the centrally disposed reflector 29, as hereinbefore described.

Figure 1:
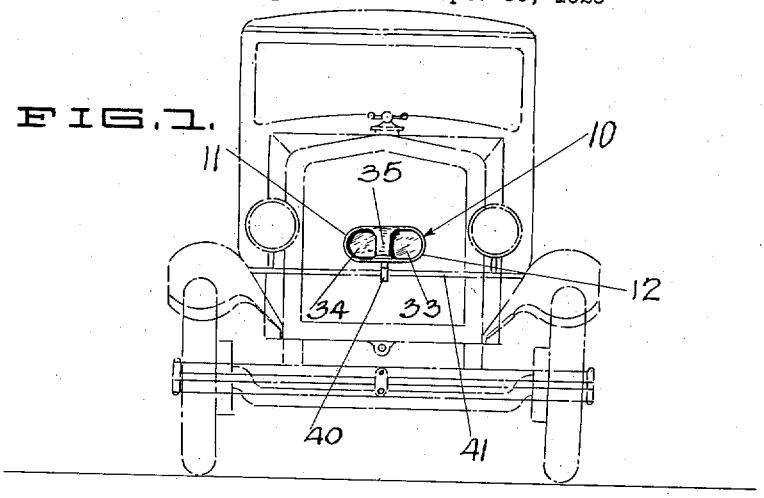
Figure 1 is a front end view of a motor vehicle shown in dot-and-dash lines, illustrating the improved duplex driving lamp mounted in place in front of the radiator of the vehicle.
Figure 2:
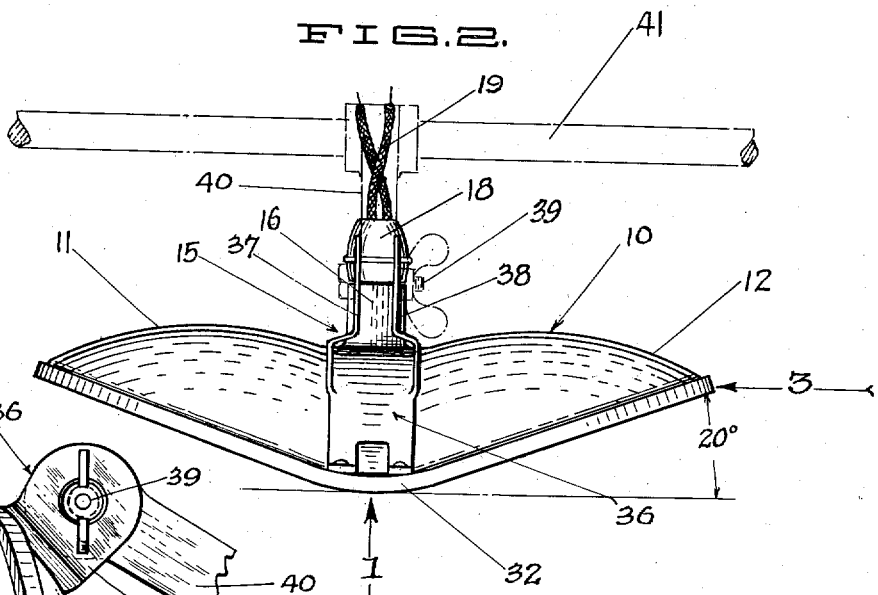
Figure 2 is an enlarged top plan view illustrating the general configuration of the lamp and its mounting bracket, the view being indicated by the arrow 2, in Figure 3.
Figure 3:
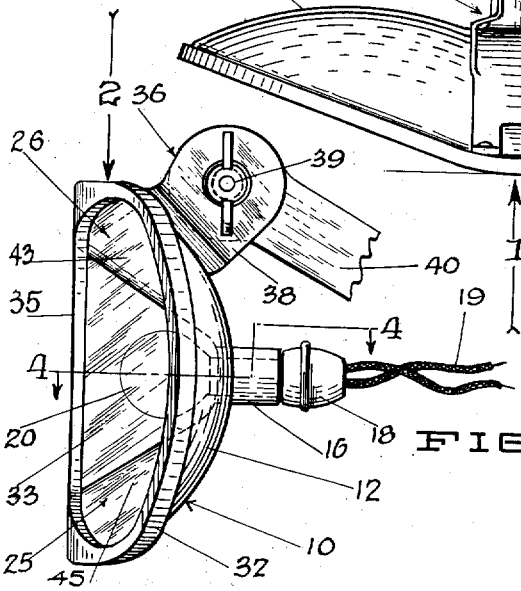
Figure 3 is an edge view of the lamp, as indicated by the arrow 3, in Figure 2, a fragmentary section of the mounting bracket being also shown.

The angle of inclination at which the front faces, or lenses, of the casing 10 are arranged relative to a line drawn across the intermediate opaque strip 35, as indicated in Figure 2, is preferably 20 degrees, or approximately, so, this angle, of course, being dependent upon the divergence desired, however, the 20 degree angle is considered sufficient for general purposes.

The lamp herein described when in operation casts divergent fan-shaped beams of light ahead of the vehicle and slightly downwardly in the paths of the steering wheels and somewhat beyond the borders of the roadway on either side, which enables the driver of the vehicle so equipped to plainly see the road ahead and to also clearly see curves in the roadway.

Drivers approaching in opposite directions are not blinded by the direct glare from the illuminant and the divergent beams of light from the illuminant also assist the driver of the approaching vehicle in determining the required clearance for the safe passing of the vehicles.

I claim and desire to secure by Letters Patent of the United States the following:—

1. A device of the class described, comprising, in combination, duplex shell-like reflectors of substantially parabolic form in cross-section and having an intermediately positioned light deflecting element, an illuminant coactively associated with said light deflecting element, and a third reflector positioned in front of said illuminant and forming a continuation of said light deflecting element to receive and reflect the light rays as received from the front end of said illuminant rearwardly and angularly to be received and re-reflected by said shell-like reflectors.

2. A device of the class described, comprising, in combination, a casing having duplex reflectors and lenses therefor arranged in open V-shaped formation, an illuminant mounted between said reflectors, an additional reflector arranged directly in front of said illuminant and between said lenses, and a light deflecting element having upper and lower sections arranged above and beneath said illuminant and forming a continuation of said additional reflector to deflect those rays from the upper and lower sides thereof rearwardly to the first mentioned reflectors.

3. In a device of the class described, a casing embodying duplex reflectors having lenses inclined rearwardly and angularly, a reflector of arcuate form in cross-section, positioned between said lenses and having an opaque background, an illuminant socket positioned between said duplex reflectors and directly in the rear of said centrally disposed reflector, and means comprising an angular light deflector element having upper and lower sections arranged centrally of the casing and extending from the illuminant socket outwardly and angularly to the centrally disposed reflector.

4. A vehicle lamp comprising a casing, a pair of duplicate light reflectors in said casing, a source of light positioned centrally between said reflectors, an angular light deflector extending upwardly and downwardly from said light source, the apex of the deflector being directed inwardly of the casing, the extent of inward direction increasing from the light source to the periphery of the casing, a curved reflector having a concave face directed toward the source of light extending from the top to the bottom of the casing and forming a continuation of the light deflector.

5. A light projector, comprising two shell-like reflectors of substantially parabolic form in cross section joined together to form a unitary reflecting member, said reflectors arranged side by side and their axes diverging forwardly in a horizontal plane, the forward edges of said reflectors making an obtuse angle with each other, a light bulb supported in the axis of the projector and having its filament forward of a vertical plane passing through the extreme lateral ends of said reflectors, and angular light deflector elements having upper and lower sections arranged centrally of the projector and extending above and below said light bulb at the junction of and cooperating with said two shell-like reflectors, whereby a shallow, wide fan-shaped extended beam of light is cast forward and downward.

WILLIAM H. CHAPMAN.